(12) United States Patent
Neugebauer et al.

(10) Patent No.: US 6,695,024 B2
(45) Date of Patent: Feb. 24, 2004

(54) PNEUMATIC TIRE HAVING TAPERED TIE BARS

(75) Inventors: Paul M. Neugebauer, Akron, OH (US); John L. Turner, Akron, OH (US); Stephen M. Vossberg, Medina, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 239 days.

(21) Appl. No.: 09/922,131

(22) Filed: Aug. 3, 2001

(65) Prior Publication Data

US 2003/0024621 A1 Feb. 6, 2003

(51) Int. Cl.⁷ .................. B60C 11/13; B60C 103/00
(52) U.S. Cl. .................. 152/209.22; 152/902
(58) Field of Search .............. 152/209.15, 209.19, 152/209.21, 209.22, 209.23, 209.24, 902

(56) References Cited

U.S. PATENT DOCUMENTS

| 1,877,988 A | 9/1932 | Schrank |
| 2,143,528 A | 1/1939 | Thomas |
| 2,701,598 A | 2/1955 | Gray |
| 3,532,147 A | 10/1970 | Gough et al. |
| 3,727,661 A | 4/1973 | Hoke |
| 3,848,651 A | 11/1974 | French |
| 4,470,443 A | 9/1984 | Eraud |
| 4,515,197 A | 5/1985 | Motomura et al. |
| 4,664,166 A | 5/1987 | Benisti |
| 4,979,549 A | 12/1990 | Kaneko |
| 5,022,448 A | 6/1991 | Ochiai |
| 5,031,680 A | 7/1991 | Kajikawa et al. |
| 5,131,444 A | 7/1992 | Kukimoto et al. |
| 5,152,854 A | 10/1992 | Matsumoto |
| 5,297,604 A | 3/1994 | Lurois |
| 5,345,988 A | 9/1994 | Kabe et al. |
| 5,439,040 A | 8/1995 | Iwamura et al. |
| 5,503,207 A | 4/1996 | Ochiai et al. |
| 5,522,442 A | 6/1996 | Kishi |
| 5,567,253 A | 10/1996 | Iwamura |
| 5,795,415 A | 8/1998 | Campana et al. |
| 5,814,169 A | 9/1998 | Yamaguchi et al. |
| 5,820,796 A | * 10/1998 | Howald et al. |
| 5,921,303 A | 7/1999 | Matsumoto |
| 5,924,464 A | 7/1999 | White |
| 5,944,082 A | 8/1999 | Thompson et al. |
| 6,012,499 A | 1/2000 | Masaoka |
| 6,405,772 B1 | * 6/2002 | Suzuki et al. |
| 6,520,230 B1 | * 2/2003 | Ratliff |
| 2002/0092591 A1 | * 7/2002 | Cortes |

FOREIGN PATENT DOCUMENTS

| EP | 0 761 479 A2 | 3/1997 |
| EP | 0 816 130 A1 | 1/1998 |
| JP | 63-297108 | * 12/1988 |
| JP | 4-100706 | * 4/1992 |
| JP | 7-17216 | * 1/1995 |

* cited by examiner

Primary Examiner—Steven D. Maki
(74) Attorney, Agent, or Firm—Michael Sand; Michael R. Huber

(57) ABSTRACT

A pneumatic tire includes a tread pattern having circumferential and lateral grooves forming a plurality of circumferentially extending ribs, each rib having a plurality of tread blocks. A plurality of tie bars extend circumferentially across certain of the lateral grooves between adjacent tread blocks in at least two of the ribs which are located equally opposite of a mid-circumferential plane of the tire. The tie bars have a pair of sidewalls and a sloped top surface with the slope of the top surface in one of the ribs being opposite to the slope of the tie bars in the other rib to generate a residual aligning torque (RAT) on the tire.

12 Claims, 5 Drawing Sheets

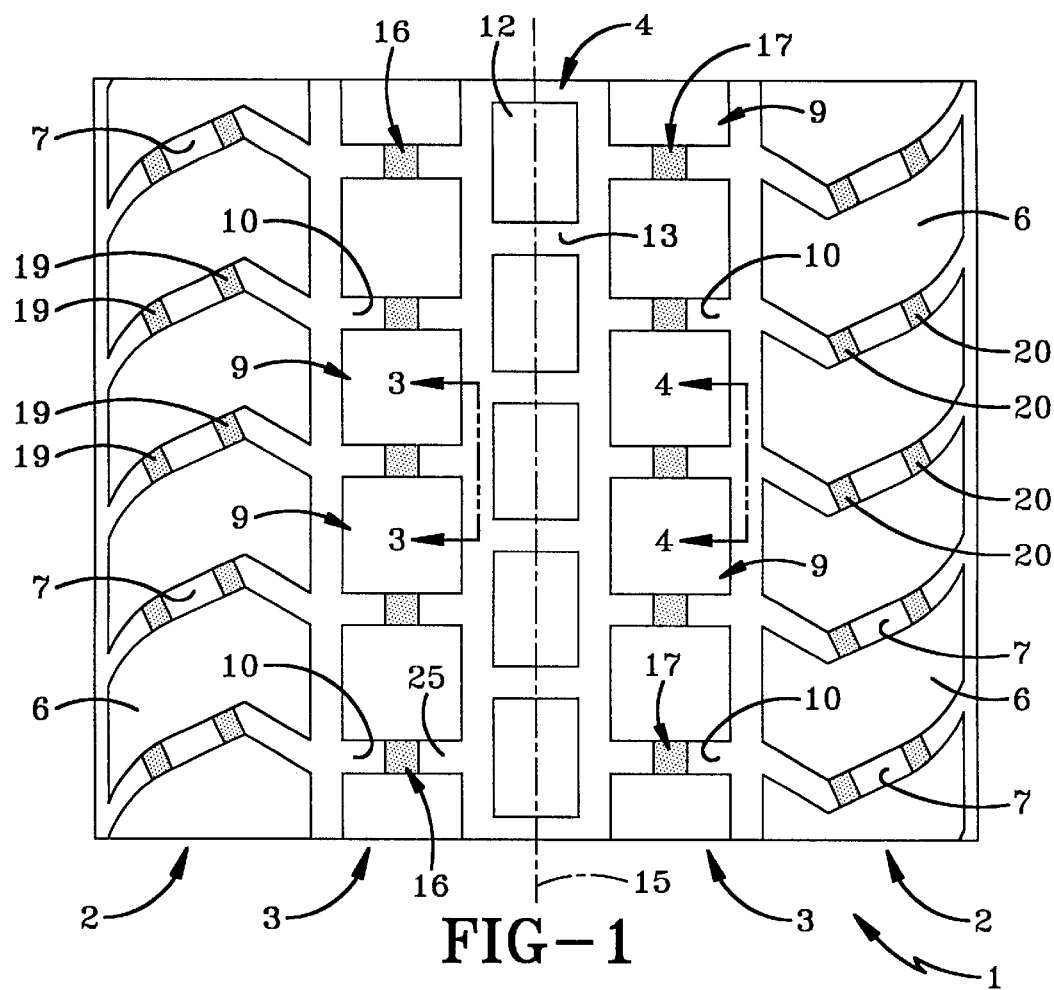
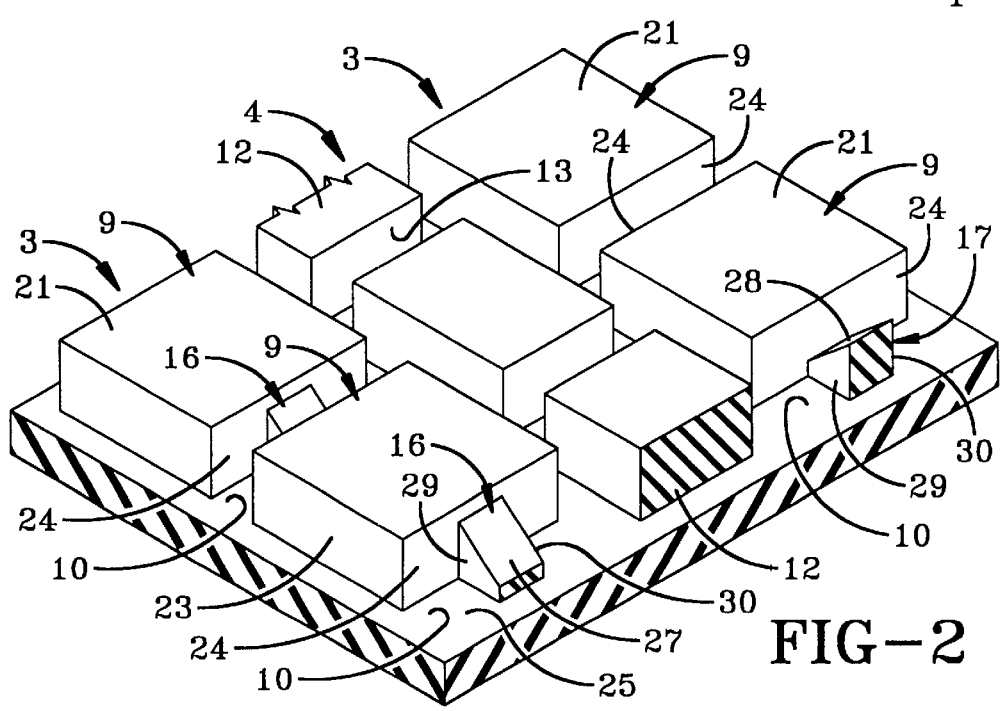
FIG-1
FIG-2

PNEUMATIC TIRE HAVING TAPERED TIE BARS

BACKGROUND OF THE INVENTION

1. Technical Field

The invention relates to pneumatic tires and in particular to pneumatic tires having tie bars extending circumferentially between adjacent tread blocks in a pair of circumferentially extending ribs located on opposite sides of a mid circumferential plane of the tire. More particularly, the tie bars are tapered in a first direction in one of the ribs and in an opposite direction in the other of said ribs to make changes in RAT (residual aligning torque) without changing the carcass or road contacting tread pattern of the tire.

2. Background Information

Pneumatic tires such as used for passenger and light trucks, have a tread pattern which extends circumferentially about the tire. The tread consists of a plurality of circumferentially and laterally extending grooves which divide the tread into generally circumferentially extending ribs formed by a plurality of either continuous or discontinuous tread blocks. The tread blocks may be separated by lateral grooves or slots which provide for expelling water to prevent hydroplaning and provide better traction in snow and mud. Even when these ribs are symmetrical and equally spaced on opposite sides of a mid-circumferential plane of the tire, they can produce a moment on the tread at the contact patch with the roadway causing a twisting moment on the tire. This moment provides a tendency for the vehicle to drift left or right when the steering wheel is released. This moment or force at the contact patch is referred to as the residual aligning torque (RAT). The effect of this twisting moment and a detailed discussion relating to the various factors thereof, and prior attempts to reduce or eliminate the same, is discussed in detail in U.S. Pat. No. 5,944,082, the contents of which are incorporated herein by reference. The tire construction and method set forth in U.S. Pat. No. 5,944,082 provides draft angles in lateral grooves of certain ribs, which angles are sloped forward on one side of the mid-circumferential plane and sloped backward on the other side of the plane. These sloped grooves allegedly result in the tread blocks sloping forward and backward during forward motion of the vehicle which induces a torque to compensate for the inherent residual aligning torque due to the tread pattern.

SUMMARY OF THE INVENTION

The present invention provides a pneumatic tire having a plurality of tie bars extending circumferentially between adjacent tread blocks in selected circumferentially extending ribs located on opposite sides of a mid-circumferential plane of the tire wherein the tie bars have sloped top surfaces extending in a forward direction in one of the ribs and in a reverse rotational direction in the corresponding axial spaced rib.

Another feature of the invention is the ability to make changes in the residual aligning torque (RAT) without changing the carcass or road contacting tread pattern by utilizing tapered tie bars extending in the fore and aft directions in opposing ribs of the tire tread pattern.

Still another feature of the invention is forming the tie bars with various heights and tapers to achieve a desired aligning moment and effect on the RAT, and in which the width of the tie bar can also be varied to effect this change in RAT.

Another feature of the invention is to provide a pneumatic tire having tapered tie bars in which the tie bars are molded integrally with the tread blocks of the tire without requiring substantial changes in the molding process or materially increasing the cost of the tire.

Another aspect of the tapered tie bars is the ability to form the taper in either slots and/or grooves which extend in a generally lateral direction with respect to the mid-circumferential plane of the tire, either perpendicularly thereto or at an angle, in order to achieve various changes in the RAT depending upon the particular tread pattern of the tire thereby avoiding redesigning the particular tread pattern.

A still further feature of the invention is to provide the tapered tie bars with either a full or partial width with respect to the lateral length of the groove and/or slot, and with either a full height or reduced height before the start of the taper with respect to the adjacent tread block, and in which the taper can extend completely to the base of the adjacent tread block or to a selected height of the wall of the adjacent tread block.

Another aspect of the invention is that modification of existing molds is made possible by removing material therefrom enabling a cost effective solution to changing a large inventory of molds at a fraction of the cost of replacing the molds.

A further aspect of the invention is to provide a change in RAT in a tire having an asymmetrical tread pattern by providing tapered tie bars between adjacent circumferentially spaced lugs on opposite sides of a geometric centerline of the tire tread, wherein the angle of taper and spacing from the centerline need not be equal and opposite, but will differ depending upon the particular asymmetrical pattern of the tire tread.

The foregoing advantages, construction and operation of the present invention will become more readily apparent from the following description and the accompanying drawings.

BRIEF DESCRIPTION OF THE DRAWINGS

FIG. 1 is a diagrammatic plan view of a tire tread having a plurality of the tapered tie bars shown therein;

FIG. 2 is an enlarged diagrammatic perspective view with portions in section of the tapered tie bars extending circumferentially between adjacent lugs in two intermediate ribs;

DESCRIPTION OF THE PREFERRED EMBODIMENTS

Figure 3:
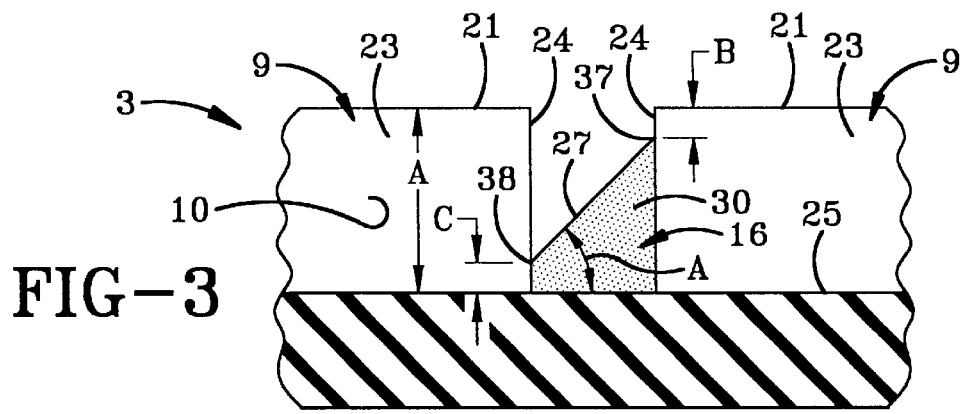
FIG. 3 is an enlarged fragmentary sectional view looking in the direction of arrows 3—3, FIG. 1.

FIG. 1 is a plan view of a portion of a substantially symmetrical tire tread pattern indicated generally at 1, which includes a pair of shoulder ribs 2, a pair of intermediate ribs 3 and a center rib 4. Each rib 2 is formed by a plurality of tread blocks 6 separated by generally V-shaped grooves 7. Each intermediate rib 3 is formed by a plurality of tread blocks 9 separated by laterally extending grooves 10. Central rib 4 is formed by a plurality of circumferentially spaced tread blocks 12 separated by lateral grooves 13. The particular shapes of the tread blocks, as well as the various directions and shapes of the intervening grooves as shown in FIG. 1, can vary considerably without affecting the concept of the invention. Likewise, shoulder ribs 2 and central rib 4 could have their tread blocks integrally connected to form a continuous rib as opposed to the discontinuous configuration of the ribs as shown in FIG. 1. Ribs 2 and 3 are spaced equally from and generally symmetrical about a mid-circumferential plane 15 of the tread pattern.

Tread blocks 9 in circumferential ribs 3 are connected by circumferentially extending tie bars 16 and 17 which extend circumferentially between adjacent tread blocks 9 within grooves 10. A plurality of tie bars 19 and 20 could also be located in shoulder ribs 2 extending between tread blocks 6 without affecting the concept of the invention. However, only tie bars 16 and 17 of intermediate ribs 3 are shown and described in detail below and are shown in the drawings. Referring to FIG. 2, each tread block 9 includes a top road engaging surface 21, a pair of spaced opposed sidewalls 23 and end walls 24. The space between end walls 24 define lateral grooves 10 which have a bottom surface indicated at 25.

Figure 4:
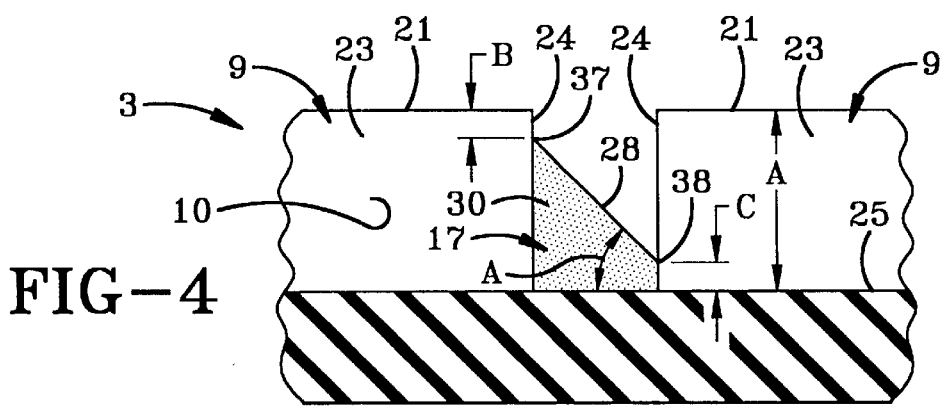
FIG. 4 is an enlarged fragmentary sectional view looking in the direction of arrows 4—4, FIG. 1.

In accordance with the invention as shown particularly in FIG. 2, tie bars 16 and 17 both of which extend circumferentially between adjacent tread blocks 9 in their respective ribs 3, have tapered top surfaces 27 and 28, respectively, which are sloped in opposite directions with respect to each other. Top surfaces 27 and 28 preferably will be smooth continuous surfaces but could vary without effecting the invention. Tie bars 16 and 17 are similar to each other with the exception of the opposite direction of sloped top surfaces. Each tie bar includes spaced, preferably parallel side surfaces 29 and 30 which preferably extend generally radially inward from the sloped top surface. Each tie bar is molded integrally with the adjacent tread block and bottom surface 25 of groove 10 during the molding of the tire tread. Thus, molding of the tire requires only minor modifications to the mold, such as removing material from the mold for forming the tie bars. FIGS. 2, 3 and 4 show one configuration of tie bars 16 and 17 wherein top surfaces 27 and 28 extend at equal angle of generally 45° with respect to bottom groove surfaces 25, and only partially across the axial width of the adjacent tread block as shown in FIG. 2.

Figure 5:
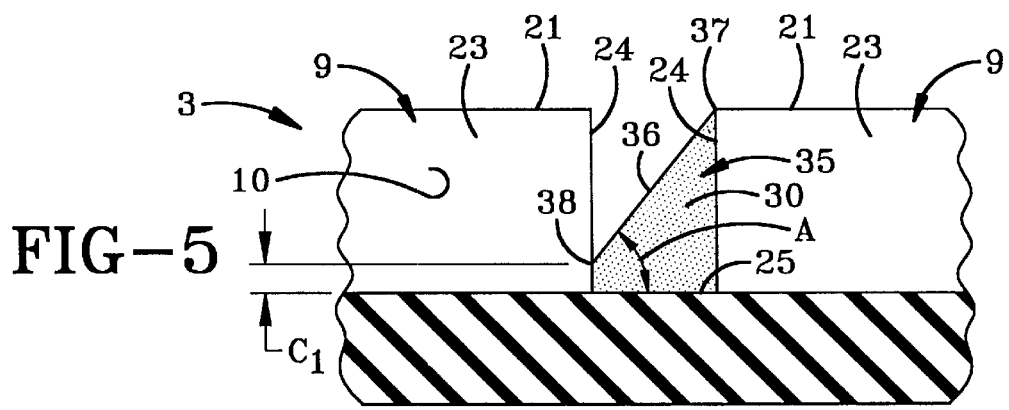
FIG. 5 is a fragmentary sectional view similar to FIG. 3 of a modified tapered tie bar.

A modified tapered tie bar is shown in FIG. 5 and is indicated at 35. Tie bar 35 has a sloped top surface 36 which extends at a steeper angle with respect to groove surface 25 than that of top surfaces 27 and 28 from tread block surface 21 to a distance $C_1$ above bottom surface 25. Tie bar 35 is shown for only one of the ribs and it is readily understood that the top surface of the tie bar on the opposite rib 3 will have the same degree of taper as tie bar 35 but opposite from that shown in FIG. 5. Likewise, both tie bars will terminate at the same distance $C_1$ above surface 25 and will extend only partially across the width of grooves 10.

Figure 6:
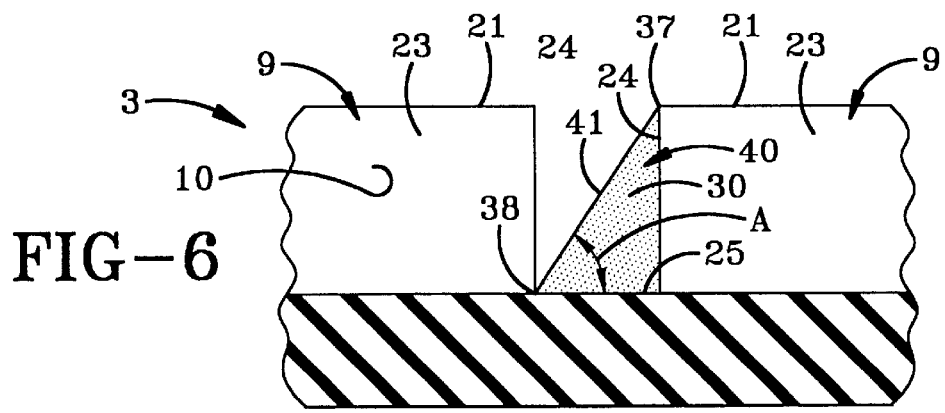
FIG. 6 is a fragmentary sectional view similar to FIGS. 3 and 5 of a further modified tapered tie bar.

FIG. 6 shows another tie bar 40 having a sloped top surface 41 which extends between top surface 21 of one tread block 9 to bottom surface 25 of the adjacent tread block. Tie bar 40 will extend only partially axially across groove 10. The laterally opposite rib 3 will have the same tie bar configuration and angle of slope as surface 41 but extending in the opposite direction.

Figure 7:
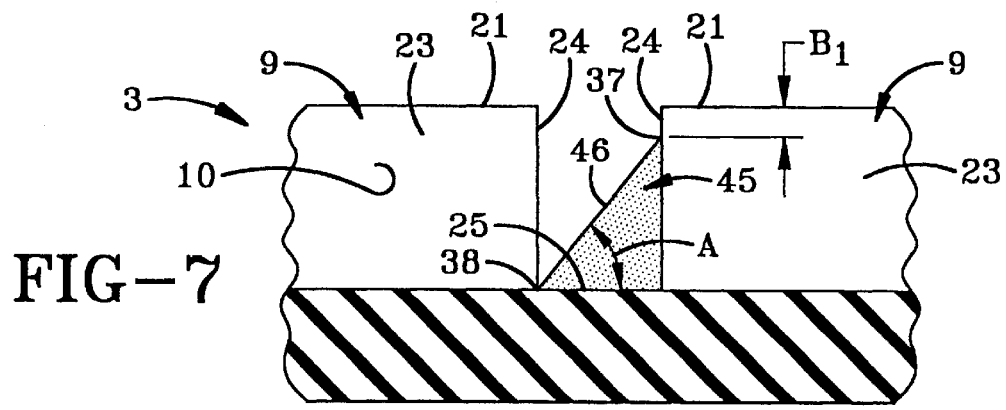
FIG. 7 is a fragmentary sectional view similar to FIGS. 3, 5, and 6 of another modified tapered tie bar.

Still another embodiment of the tie bar is indicated generally at 45, and is shown in FIG. 7. Tie bar 45 includes a sloped top surface 46 extending from a distance $B_1$ downwardly from top surface 21 to the base of the circumferentially adjacent end wall 24 at groove bottom surface 25.

Figure 8:
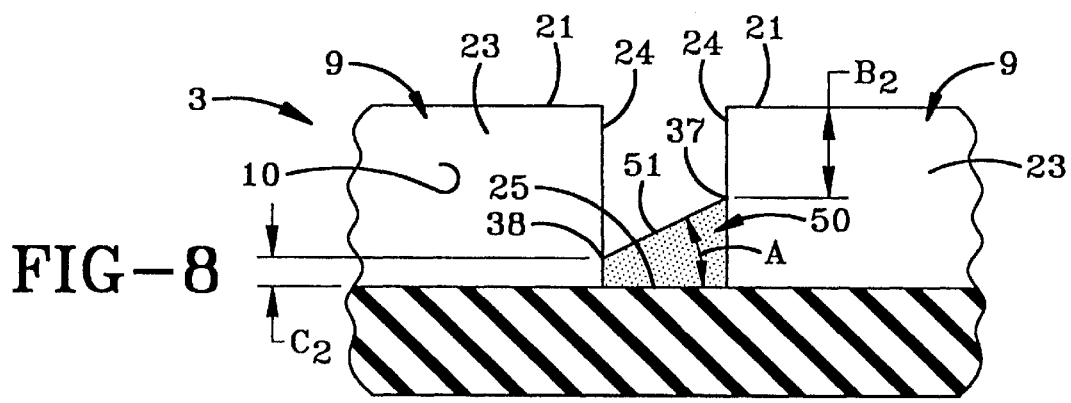
FIG. 8 is a fragmentary sectional view similar to FIGS. 3, 5, 6, and 7 of a modified tapered tie bar.

Another modified tie bar configuration is shown in FIG. 8 and is indicated at 50. Tie bar 50 includes a sloped top surface 51 which extends between circumferentially spaced end walls 24 at a pre-selected angle. Surface 51 starts at a distance $B_2$ below top surface 21 of one tread block 9 and terminates at a distance $C_2$ above groove bottom surface 25 at the opposing tread block wall 24.

Figure 9:
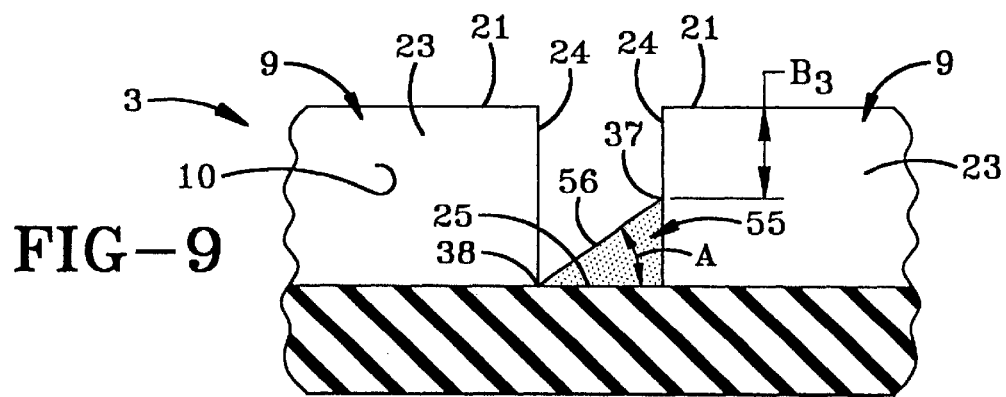
FIG. 9 is a fragmentary sectional view similar to FIGS. 3, 5, 6, 7, and 8 of a modified tapered tie bar.

A further tie bar embodiment is indicated generally at 55, and is shown in FIG. 9. Tie bar 55 has a sloped top surface 56 which extends circumferentially between opposed end walls 24 with the higher end of the tie bar starting at distance $B_3$ below top surface 21 and connects to the adjacent sidewall 24 at the junction with bottom surface 25.

FIGS. 3–9 illustrate that the particular shape of the tie bars can vary considerably, without affecting the invention and can extend between the top surface of one of the tread blocks to various levels indicated generally at C of the adjacent tread block such as shown in FIGS. 3, 4, 7, 8 and, 9. In these embodiments, the tie bar can extend completely across with width of groove 10, that is, the full axial length of end walls 24, whereas in the embodiments shown in FIGS. 5 and 6 the tie bars will extend only partially along the axial length of end walls 24 or the width of grooves 10. The angle of slope of the various tie bar top surfaces preferably is within the range of 10° to 75° with respect to the bottom surface of grooves 25 as shown by Angle A. The preferred angle of slope is 40° to 45° which provides the desired change in RAT for many of the types of tires in which the opposed tapered tie bars will be incorporated. Likewise, distances B and C will vary between ⅔ and 0 of the height of end walls 24 which will provide for the desired angle of slope discussed above. A distance B represents the distance that an upper junction 37 of the sloped top surface is below top surface 21 of adjacent block 9 and distance C represents the distance that a lower junction 38 is above groove surface 25.

A different change of RAT will be achieved with each of the tie bar configurations shown in FIGS. 3–9. This change in slope and locations of contact with the adjacent tread block walls also will affect the stiffness of the tread blocks. For example, the tie bar configuration of FIG. 7 will provide a stiffer tread block then that of FIG. 9 in addition to providing a change in RAT.

Again, it is readily understood that in the various tie bar embodiments shown in FIGS. 3–9 the corresponding tie bar in the laterally opposite rib 3 will have the same configuration but a top surface sloped in the opposite direction in order to provide the advantages of the present invention. Again, the critical feature is the providing of sloped tie bars in similar ribs located at equal distances on opposite sides of mid-circumferential plane 15 and sloped in opposite directions to each other to provide for the desired moment on the tread block and tire tread at the contact patch with the ground.

Figure 10:
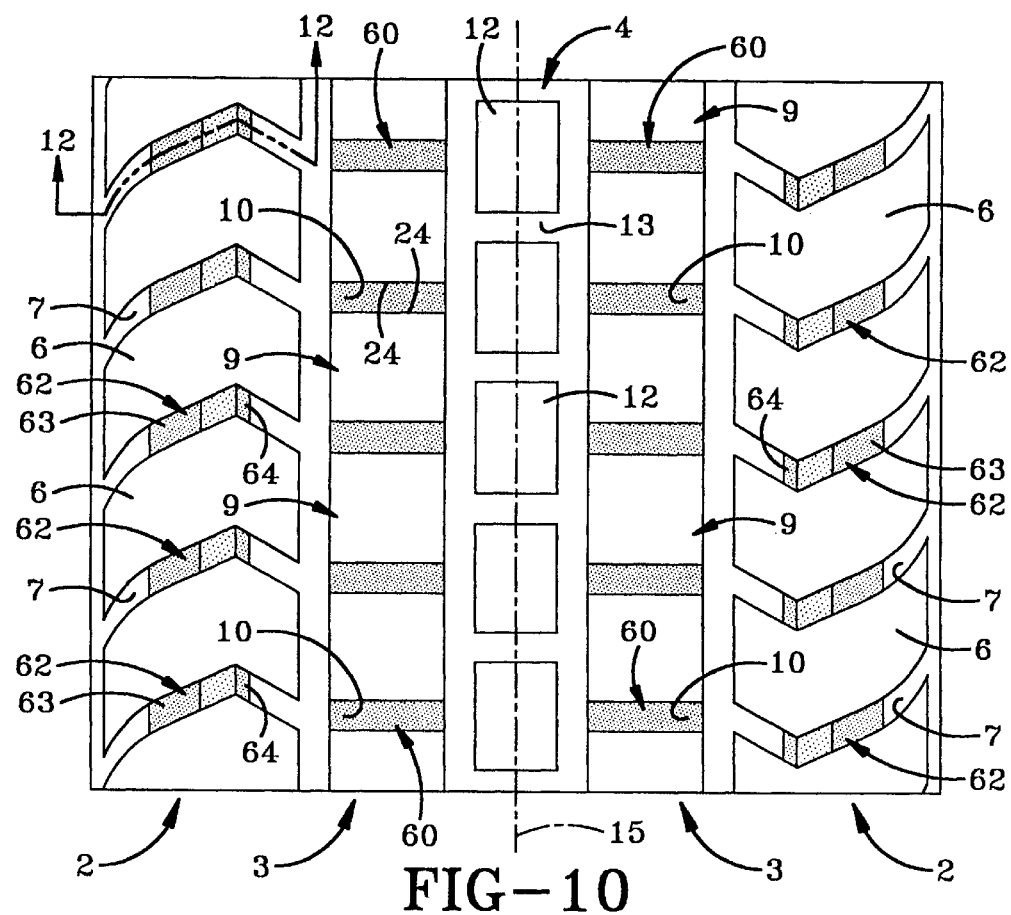
FIG. 10 is a diagrammatic plan view similar to FIG. 1 of a modified tire tread pattern.
Figure 11:
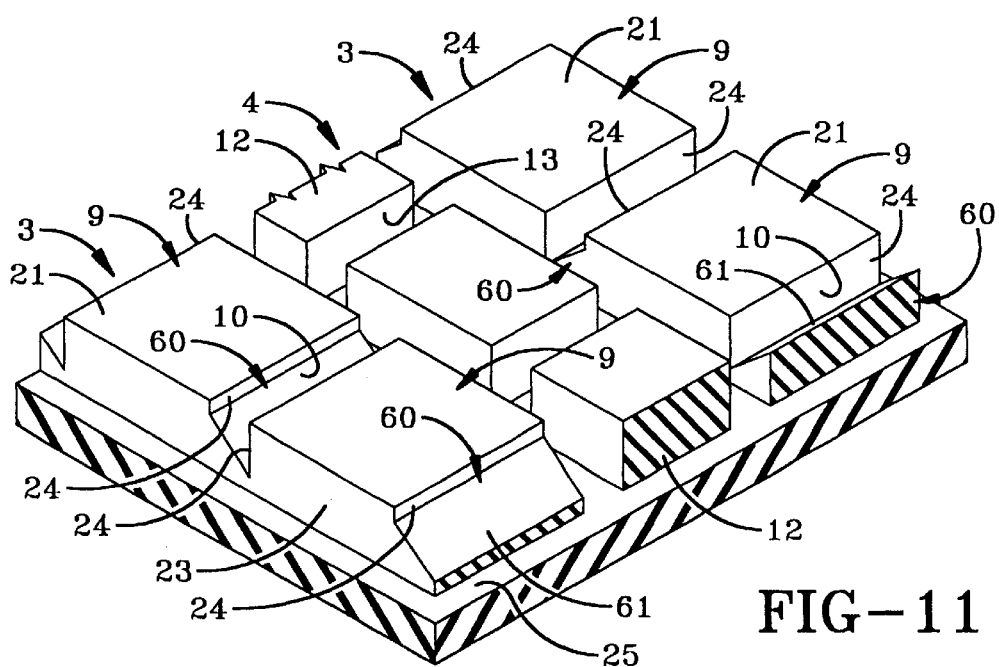
FIG. 11 is an enlarged diagrammatic perspective view with portions in section, showing the tapered tie bars in the modified tread pattern of FIG. 10.

A further modified tie bar configuration is indicated generally at 60, and is shown in FIGS. 10 and 11. Tie bar 60 is similar in many respects to the various tie bars discussed above except that it has a considerably greater lateral or axial width than that of the various tie bar embodiments discussed above. As shown in FIGS. 10 and 11, tie bar 60 extends completely throughout the width of adjacent tread blocks 9 and will have a sloped top surface 61 which can take the various configurations and angles shown in FIGS. 3, 4, 7, 8, and 9 when extending between adjacent tread block end walls 24. Also, the angle of taper and points of contact at the ends of the sloped surfaces with the adjacent end walls can vary without affecting the concept of the invention so long as the laterally opposed tie bars are similar but inclined in an opposite direction. It is furthermore understood that the sloped tie bars need not be in every groove of ribs 2 or 3 as shown in FIGS. 1 and 10 but could be in selected grooves so long as the axially opposite groove has the corresponding tie bar sloped in the opposite direction.

Figure 12:
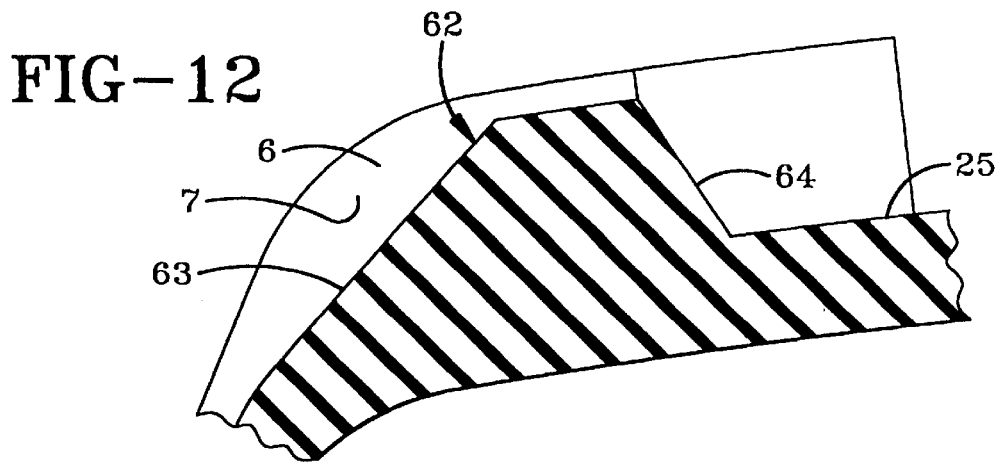
FIG. 12 is an enlarged fragmentary sectional view taken on line 12—12, FIG. 10.

Shoulder ribs 2 can be provided with tie bars 62 as shown in FIGS. 10 and 12 which can have sloped side surfaces 63 and 64 of different angles than the vertical side surfaces 29 of the tie bars discussed above which also can have sloped side walls if desired. Surfaces 63 and 64 extend outwardly in a generally axial direction and may have a somewhat curved configuration in the outer shoulder region.

Thus, by tapering the tie bars in the fore and aft direction in similar and oppositely spaced ribs from the mid-circumferential plane of a tire having a substantially symmetrical tread pattern enables various changes in RAT without changing the carcass or road contacting tread pattern. The amount of change can vary depending upon the configuration of the tie bars with respect to the adjacent tread block lugs.

Figure 13:
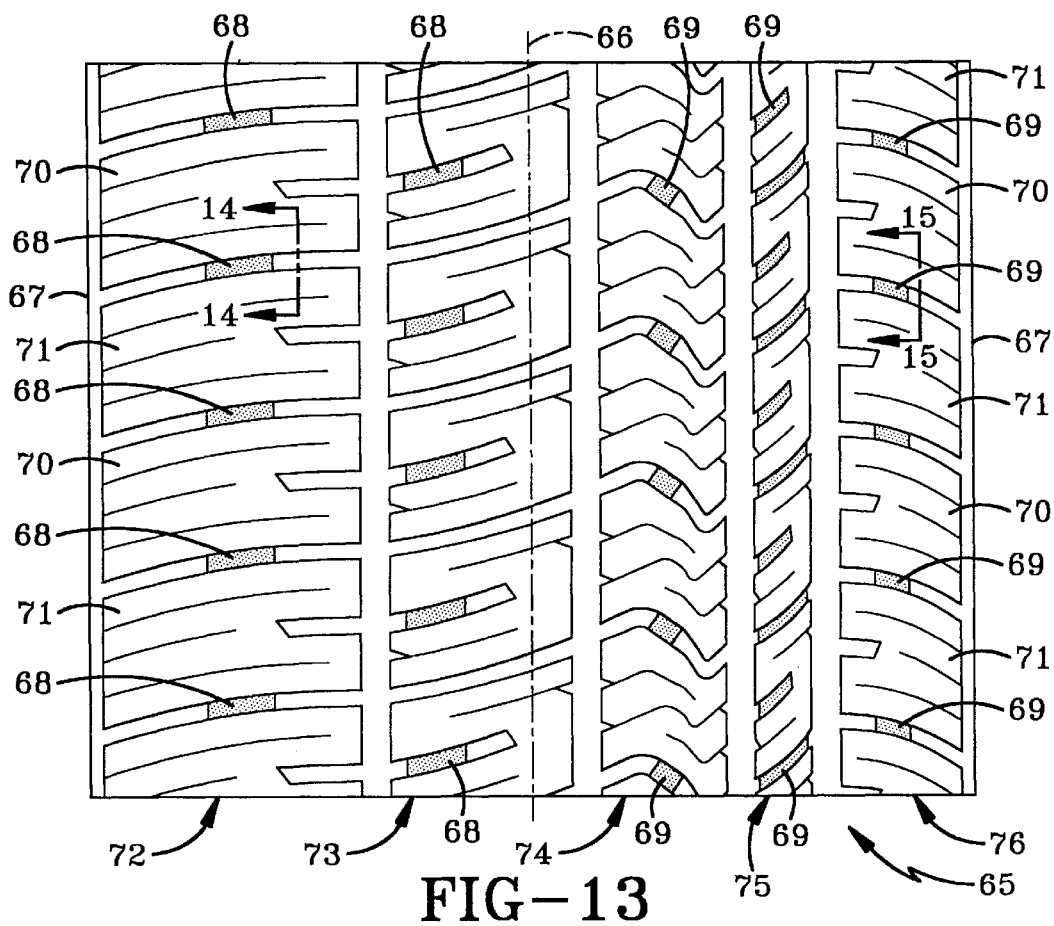
FIG. 13 is a diagrammatic plan view of an asymmetrical tire tread containing tapered tie bars.
Figure 14:
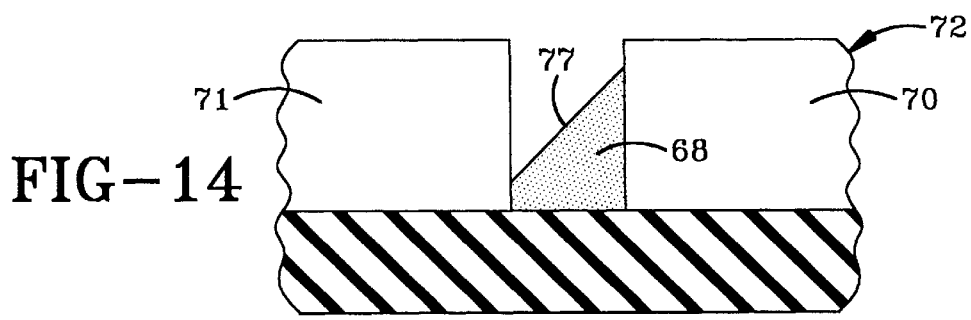
FIG. 14 is an enlarged fragmentary sectional view looking in the direction of arrow 14—14, FIG. 13.
Figure 15:
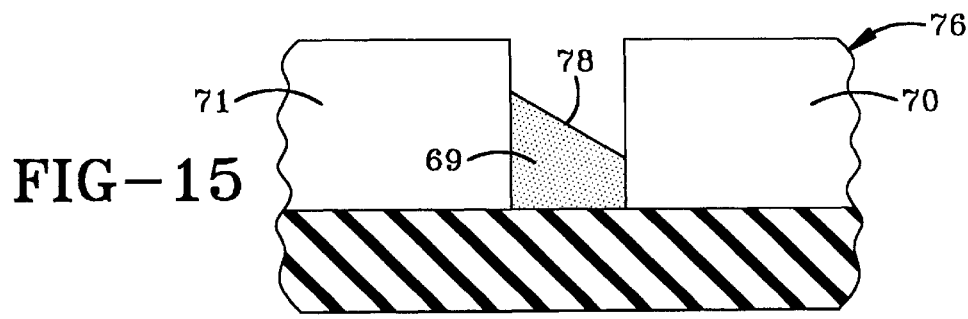
FIG. 15 is a view similar to FIG. 14 looking in the direction of arrow 15—15, FIG. 14.

A modified tire tread pattern is indicated generally at 65 and is shown in FIG. 13. This is an asymmetrical tread wherein the plurality of ribs and circumferential grooves are not symmetrical on opposite sides of a geometric centerline 66 of the tire, that is, an imaginary line equidistant between opposite sides 67 of the tire which will also coincide with the mid-circumferential plane 15 of the tread patterns discussed above. A change in RAT can also be achieved in asymmetrical tread pattern 65 by providing tapered tie bars 68 and 69 extending circumferentially between adjacent tread blocks 70 and 71 of individual ribs 72, 73, 74, 75, and 76 as shown in FIG. 13. Top walls 77 and 78 of the tie bars will be sloped in opposite directions with respect to each other, but will vary in angle in order to provide for a desired change in RAT by varying the number of tapered tie bars, their locations in the individual ribs, and the angle of slope on one side of centerline 66 with respect to the number of tie bars, angle of slope, and rib location on the opposite side of the centerline. Again, the main feature is that the sloped tie bars extend in opposite directions with respect to the tie bars on opposite sides of centerline 66. Again, the angles of slope and the starting and ending points of top walls 77 and 78 with respect to the adjacent tread lug can vary as shown in FIGS. 3–9.

While the embodiments of the invention have been described, the invention is not limited thereto. The claims of the invention follow.

What is claimed is:

1. A pneumatic tire having a tread extending about an outer circumference of the tire, said tread having at least first and second axially spaced circumferentially extending ribs located on opposite sides of a geometric centerline of the tire, each rib having a plurality of circumferentially spaced tread blocks separated by generally laterally extending grooves, said lateral grooves being defined by a bottom surface and spaced end walls of adjacent tread blocks; certain of said lateral grooves having tie bars extending across said grooves between adjacent end walls of the tread blocks, each of said tie bars having a pair of side surfaces and a top surface, the top surfaces of the tie bars have axial widths less than the axial widths of the adjacent tread blocks and slope radially inwardly in the same circumferential direction in the first rib, and slope radially inwardly in the same circumferential direction in the second rib, wherein all of the top surfaces of the tie bars in the second rib slope radially inwardly in a circumferential direction opposite to the direction of the slope of each of the top surfaces of the tie bars in the first rib.

2. The tire defined in claim 1 in which the side surfaces of the tie bars are parallel to each other.

3. The tire defined in claim 1 in which the top surfaces of the tie bars are smooth flat continuous surfaces.

4. The tire defined in claim 1 in which an upper junction of the sloped top surfaces of said tie bars with the end walls of the tread blocks is at a distance of between 0 and ⅔ of the depth of the lateral grooves below the top surfaces of said tread blocks.

5. The tire defined in claim 1 in which a lower junction of the sloped top surfaces of the tie bars with the end walls of the tread blocks is at a distance of between 0 and ⅔ of the depth of the lateral grooves.

6. The tire defined in claim 1 wherein the side surfaces of certain of the tie bars are sloped in a generally axial direction.

7. The tire defined in claim 1 in which the sloped top surfaces extend from a top surface of a tread block to adjacent the bottom surface of the lateral groove.

8. The tire defined in claim 1 in which the angle of slope of the tie bar top surfaces is between 10° and 75° with respect to the bottom surfaces of the lateral grooves.

9. The tire defined in claim 8 in which the angle of slope is within 40° and 45°.

10. The tire defined in claim 1 in which the top surfaces of the tie bars in the first rib have an angle of slope substantially equal and opposite to an angle of slope of the top surfaces of the tie bars in the second rib.

11. The tire defined in claim 10 in which the tie bars in the first and second ribs are located equidistant on opposite sides of the centerline of the tire.

12. The tire defined in claim 1 in which the tread has an asymmetrical pattern and the first and second ribs are located at unequal axial distances from the centerline of the tire.

* * * * *